No. 759,139. PATENTED MAY 3, 1904.
R. TEMPLE.
EXPANSION PULLEY.
APPLICATION FILED DEC. 31, 1902. RENEWED APR. 4, 1904.
NO MODEL. 2 SHEETS—SHEET 1.
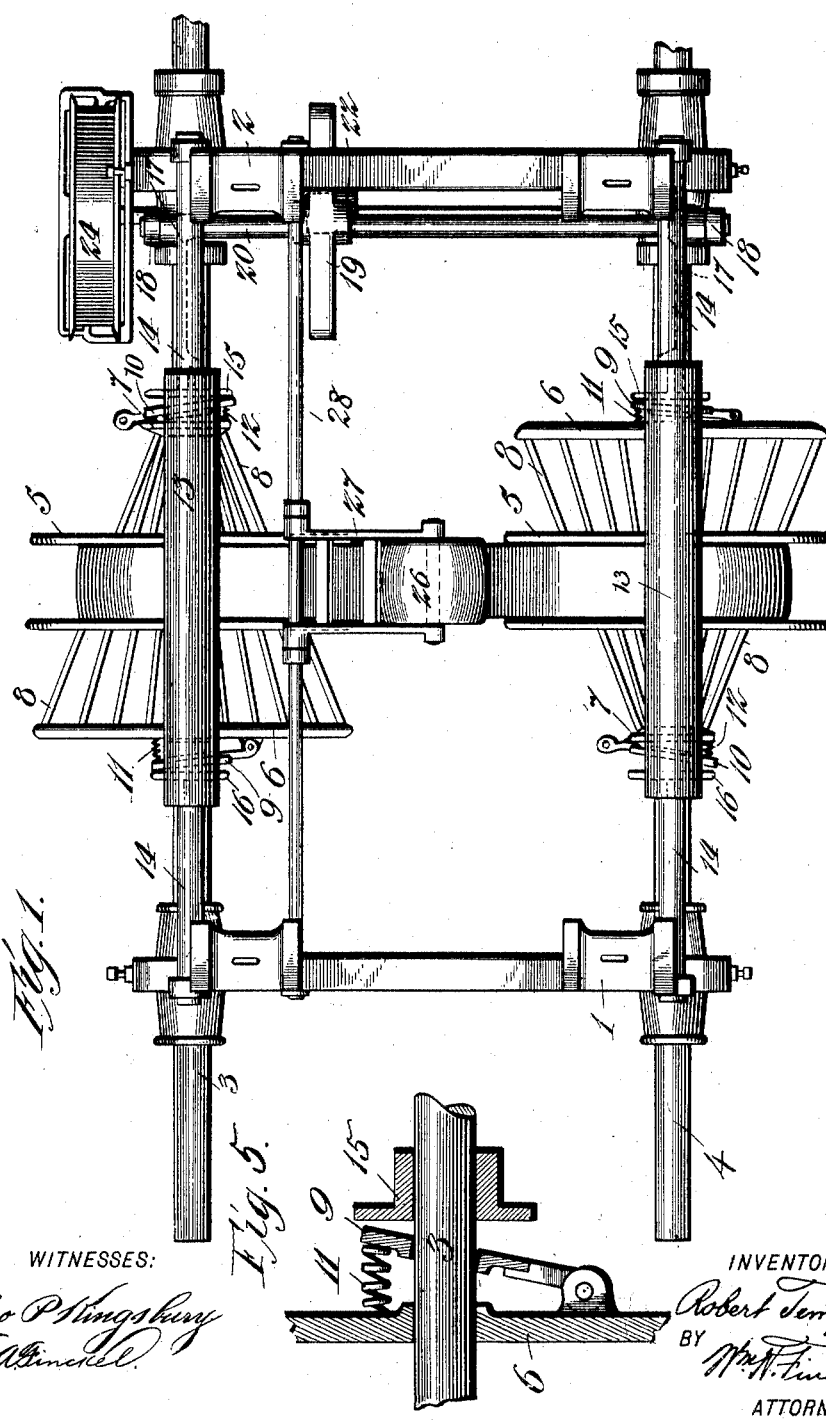
WITNESSES:
Geo P Kingsbury
E A Finckel
INVENTOR
Robert Temple
BY
W H Finckel
ATTORNEY No. 759,139. PATENTED MAY 3, 1904.
R. TEMPLE.
EXPANSION PULLEY.
APPLICATION FILED DEC. 31, 1902. RENEWED APR. 4, 1904.
NO MODEL. 2 SHEETS—SHEET 2.
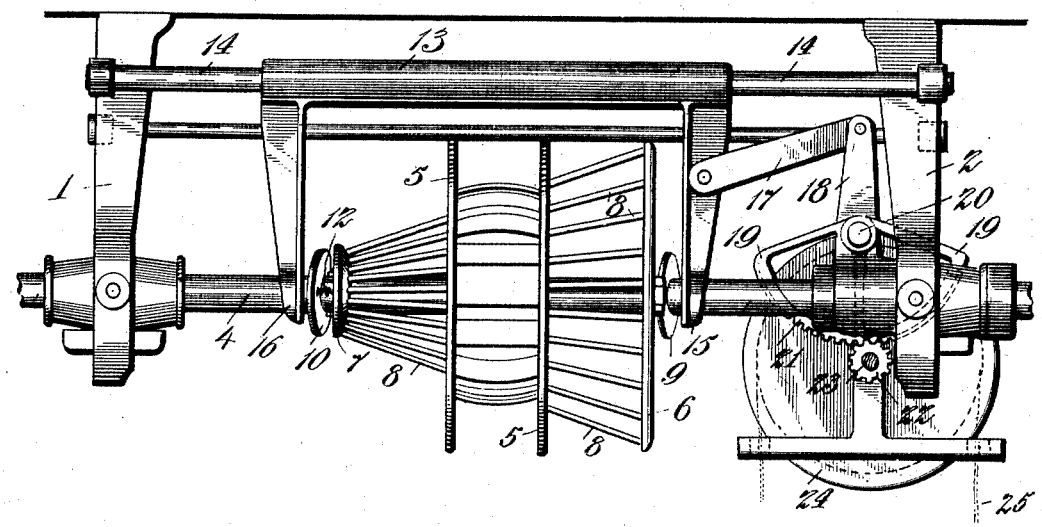
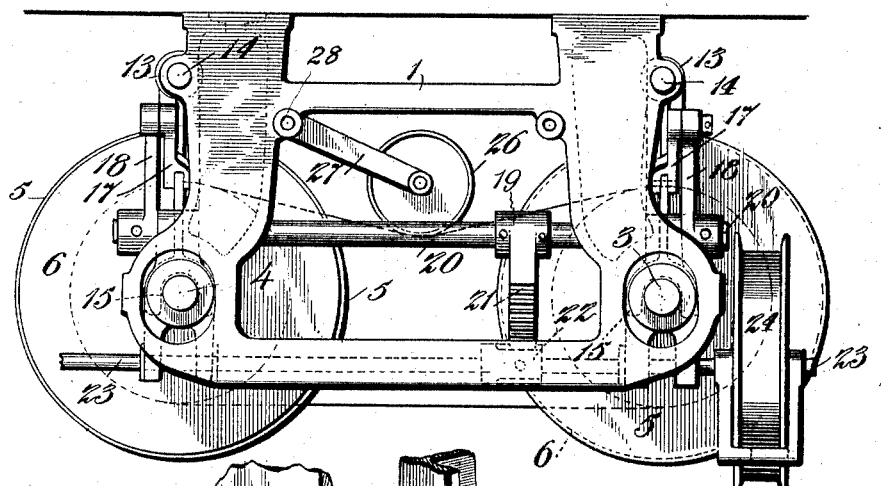
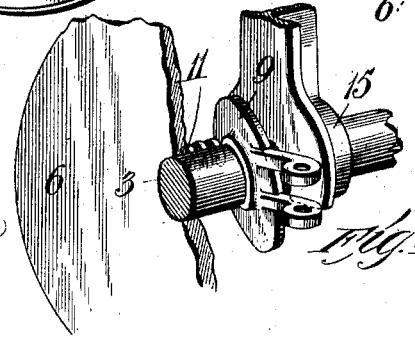
WITNESSES:
Geo. P. Kingsbury
E. A. Finckel
INVENTOR
Robert Temple
BY
Wm. H. Finckel
ATTORNEY.

No. 759,139. Patented May 3, 1904.

UNITED STATES PATENT OFFICE.

ROBERT TEMPLE, OF DENVER, COLORADO, ASSIGNOR TO THE AMERICAN EXPANSION PULLEY COMPANY, OF DENVER, COLORADO, A CORPORATION OF COLORADO.

EXPANSION-PULLEY.

SPECIFICATION forming part of Letters Patent No. 759,139, dated May 3, 1904.

Application filed December 31, 1902. Renewed April 4, 1904. Serial No. 201,595. (No model.)

*To all whom it may concern:*

Be it known that I, ROBERT TEMPLE, a citizen of the United States, residing at Denver, in the county of Arapahoe and State of Colorado, have invented a certain new and useful Improvement in Expansion-Pulleys, of which the following is a full, clear, and exact description.

This invention relates to means for operating and holding in adjusted position the expanding member of expansible pulleys which require a movement lengthwise of the shaft in order to effect variations in the diameter of the pulleys.

The invention consists of an automatic shaft-gripping device applied to the expanding member of the pulley which is movable lengthwise of the shaft in order to vary the diameter of that portion of the pulley upon which the belt rests, and in connection with this automatic gripping device it is preferred to use an operating device having the double function of releasing the gripping device and moving the expanding member.

The invention is shown herein as applied to the form of expansible pulley shown in my Patent No. 647,429, granted April 10, 1900; but of course the invention is not limited to that particular form of expansible pulley, but is applicable generally to that class of expansible pulleys where the expansible pulley proper is provided with an expanding member which is movable longitudinally of the shaft for effecting variations in the diameter of the pulley. However, for the sake of a concrete example the invention will be described in connection with this patented form of expansible pulley.

It is to be noted here that in order to obtain a practically effective and useful device for the purpose mentioned it is desirable, if not necessary, that it be capable of operation while the pulleys are in motion and so that the speed can be varied instantly at any time and without stopping the machinery.

In the accompanying drawings, illustrating the invention, in the several figures of which like parts are similarly designated, Figure 1 is a plan view showing the arrangement of two expansible pulleys for changing speed. Fig. 2 is a side elevation, one hanger being partly broken away. Fig. 3 is an end view. Fig. 4 is a fragmentary perspective view. Fig. 5 is a fragmentary horizontal section.

The invention is shown as applied to overhead pulleys, in which frames or hangers 1 and 2 are supplied with bearings for shafts 3 and 4. On these shafts are fixed the disk members 5 of the pulley proper to be expanded. Also on these shafts are loosely placed the disks 6 and 7 of the expanding member, these disks 6 and 7 being of different diameters and connected by rods 8. These members 6, 7, and 8 form a cone on each shaft which passes through the pulley member and by movement lengthwise of the shaft serves to vary the diameter of the pulley. As already indicated, the invention herein is not limited to this particular form of expansible pulley, but is applicable to any expansible pulley where the pulley member proper is acted upon by an expanding member, such as the cone mentioned. Describing one of these devices, it is noted that to the disks 6 and 7 are pivoted ring-like devices 9 and 10, respectively, of similar construction, which encircle the shaft, and between these ring-like members and disks are interposed springs 11 and 12, which normally tend to throw the ring-like members away from the disks and at an angle thereto and to the shaft, so that they shall have a biting or gripping action upon the shaft sufficient to hold to the cone in any position to which it may be adjusted lengthwise of the shaft, and it will be observed that these ring-like devices project from the disks in opposite directions, and thereby serve to hold the cone at both ends from accidental movement in opposite directions. These ring-like devices are the devices herein referred to as "gripping" devices. So long as the springs hold the gripping devices thrown out from the disks so long will the cone be held or gripped in adjusted position upon the shaft.

A convenient means for releasing the gripping devices and at the same time adjusting the cone upon the shaft may be composed of a yoke 13, mounted to slide upon a rod 14, mounted in the frames 1 and 2 and having depending forked arms 15 and 16, which straddle the shaft on opposite sides of the cone or expanding member and spaced apart a distance sufficient to stand free of the gripping devices. One convenient means for operating the yoke consists of a link 17, jointed to an arm 18, controlled by a rock-lever 19, both mounted upon a shaft 20, arranged transversely in the hanger, said lever having a toothed segment 21 meshing with a pinion 22 on a shaft 23, also mounted transversely in the hanger. This shaft 23 is provided with a drum 24, which may be supplied with an endless band or other operating device 25, (shown in dotted lines, Fig. 2,) which band depends into convenient reach of an operator on the floor.

If the yoke be moved to the left, Fig. 2, the gripping device 9 will be released from engagement with the shaft, and then the cone or expanding member may be moved to the left, which will result in the increase of the diameter of the pulley. Upon such movement the gripping device 10 will be automatically released from the shaft. By a reverse movement of the drum 24 the arm 16 will engage the gripping device 10 and release its grip upon the shaft and the cone or adjusting device will be moved to the right, so as to decrease the diameter of the pulley, the gripping device 9 being by this movement freed from engagement with the shaft. Whenever the yoke comes to rest free of the gripping devices, the springs 11 and 12 will restore the gripping devices automatically into gripping engagement with the shaft to hold the expanding member or cone in its adjusted position.

As herein shown, I prefer to use a belt-tightener or slack-take-up roller 26 above the belt. This roller is mounted in a swinging frame 27, hung upon a rod 28, secured between and upon the hangers 1 and 2.

The invention is not limited to the particular yoke herein described for actuating the gripping devices and expanding member, nor to the means for actuating this yoke; but, on the contrary, other means may be substituted, and if necessary independent means may be used for releasing the gripping devices and moving the expanding member, although obviously a device such as herein shown for accomplishing both purposes is preferable.

I have herein shown my invention applied to the operation of a pair of expansible pulleys on parallel shafts, and the description herein applies to both pulleys; but the invention is applicable to a single expansible pulley.

The invention is not limited to the particular form of gripping devices herein shown.

What I claim is—

1. An expansible pulley, comprising an expansible member, an expanding member for varying its diameter, and a support for the two, combined with an automatic gripping device for retaining said expanding member in adjusted position.

2. In an expansible pulley, a shaft, an expansible member fixed thereto, an expanding member slidably mounted upon said shaft and capable of adjustment on said shaft to vary the diameter of the pulley, and an automatic gripping device applied to said expanding member, and adapted to grip the shaft to hold said expanding member in adjusted position.

3. In an expansible pulley, a shaft, an expansible member fixed thereto, an expanding member slidably mounted upon said shaft and capable of adjustment on said shaft to vary the diameter of the pulley, and a spring-pressed gripping device applied to said expanding member, and adapted to grip the shaft to hold said expanding member in adjusted position.

4. In an expansible pulley, a shaft, an expansible member fixed thereto, an expanding member slidably mounted upon said shaft and capable of adjustment on said shaft to vary the diameter of the pulley, and a spring-pressed gripping device applied to opposite ends of the expanding member and adapted to grip the shaft to hold said expanding member in adjusted position.

5. In an expansible pulley, a belt-receiving member, a shaft to which it is fixed, an expanding member to vary the diameter of the pulley, mounted upon the said shaft and movable lengthwise of the shaft to effect variation in diameter of the pulley, gripping-rings hinged to the expanding member and embracing the shaft, and springs interposed between the gripping-rings and the expanding member and tending to force the gripping-rings into position to engage the shaft.

6. In an expansible pulley, a shaft, an expansible member mounted thereon, a pulley-expanding member slidable lengthwise of the shaft, shaft-gripping devices applied to said expanding member, a yoke adapted to engage said gripping devices and the expanding member, a rock-lever, connections between the rock-lever and yoke, and means for actuating the rock-lever to move the yoke and consequently the expanding member relatively to the expansible member.

7. A pair of shafts, expansible pulleys fixed thereto, expanding devices for said pulleys slidable lengthwise of said shafts, shaft-gripping devices applied to said expanding devices, yokes for releasing the gripping devices and moving the expanding devices, and means to actuate said yokes.

In testimony whereof I have hereunto set my hand this 27th day of December, A. D. 1902.

ROBERT TEMPLE.

Witnesses:
 LEONARD DATES,
 R. H. PORTER.